(12) United States Patent
Marom Tchaicheeyan et al.

(10) Patent No.: US 11,442,373 B2
(45) Date of Patent: Sep. 13, 2022

(54) LIQUID ELECTROSTATIC INK COMPOSITION

(71) Applicant: HP Indigo B.V., Amstelveen (NL)

(72) Inventors: Hanit Marom Tchaicheeyan, Nes Ziona (IL); Albert Teishev, Rishon le-zion (IL); Igor Shutyi, Nes Ziona (IL); Yael Kowal-Blau, Givataim (IL); Matan Schneider, Nes Ziona (IL)

(73) Assignee: HP Indigo B.V., Amstelveen (NL)

(*) Notice: Subject to any disclaimer, the term of this patent is extended or adjusted under 35 U.S.C. 154(b) by 225 days.

(21) Appl. No.: 16/603,715

(22) PCT Filed: Jul. 10, 2017

(86) PCT No.: PCT/EP2017/067231
§ 371 (c)(1),
(2) Date: Oct. 8, 2019

(87) PCT Pub. No.: WO2019/011400
PCT Pub. Date: Jan. 17, 2019

(65) Prior Publication Data
US 2021/0088925 A1  Mar. 25, 2021

(51) Int. Cl.
*G03G 9/13* (2006.01)
*C09D 11/107* (2014.01)

(52) U.S. Cl.
CPC .......... *G03G 9/131* (2013.01); *C09D 11/107* (2013.01)

(58) Field of Classification Search
CPC .... G03G 9/131; C09D 11/107; C09D 11/106; C09D 11/02; C09D 11/03
See application file for complete search history.

(56) References Cited

U.S. PATENT DOCUMENTS

| | | | |
|---|---|---|---|
| 7,673,564 B2 | 3/2010 | Wolf et al. | |
| 8,568,863 B2 | 10/2013 | Servante et al. | |
| 2004/0023143 A1 | 2/2004 | Ben-Avraham et al. | |
| 2006/0025496 A1 | 2/2006 | Grandhee et al. | |
| 2011/0041715 A1 | 2/2011 | Bower et al. | |
| 2013/0323636 A1* | 12/2013 | Bar-Haim | G03G 9/1355 430/108.23 |
| 2016/0320718 A1* | 11/2016 | Ng | G03G 9/125 |
| 2016/0342103 A1 | 11/2016 | Ron et al. | |

FOREIGN PATENT DOCUMENTS

| | | |
|---|---|---|
| JP | S57010663 | 1/1982 |
| WO | WO-2013007307 | 1/2013 |
| WO | WO-2014079482 | 5/2014 |
| WO | WO-2016116140 | 7/2016 |
| WO | WO-2016116141 | 7/2016 |
| WO | WO-2016116142 | 7/2016 |
| WO | WO-2016173632 | 11/2016 |
| WO | WO-2016188757 | 12/2016 |
| WO | WO-2017012640 | 1/2017 |
| WO | WO-2017063719 | 4/2017 |
| WO | WO-2017071751 | 5/2017 |

OTHER PUBLICATIONS

Uflex Launches Direct UV Offset Printable Polyester Film; Dec. 5, 2016; http://www.uflexltd.com/biog/uflex-launches-direct-uv-offeet-printable-polyester-film/.

* cited by examiner

*Primary Examiner* — Jessica M Roswell
(74) *Attorney, Agent, or Firm* — Dierker & Kavanaugh PC

(57) ABSTRACT

An electrostatic ink composition comprising a carrier liquid; a first resin comprising a copolymer of an alkylene monomer and a methacrylic acid monomer; and a second resin comprising a copolymer of an alkylene monomer and an acrylic acid monomer, wherein the second resin constitutes at least 35 wt. % of the total amount of resin is disclosed.

13 Claims, 3 Drawing Sheets

LIQUID ELECTROSTATIC INK COMPOSITION

Electrostatic printing processes can involve creating an image on a photoconductive surface, applying an ink having charged particles to the photoconductive surface, such that they selectively bind to the image, and then transferring the charged particles in the form of the image to a print substrate.

The photoconductive surface may be on a cylinder and may be termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper or plastic film) directly or, more commonly, by being first transferred to an intermediate transfer member, which can be a soft swelling blanket, and then to the print substrate.

DETAILED DESCRIPTION

Figure 1A:
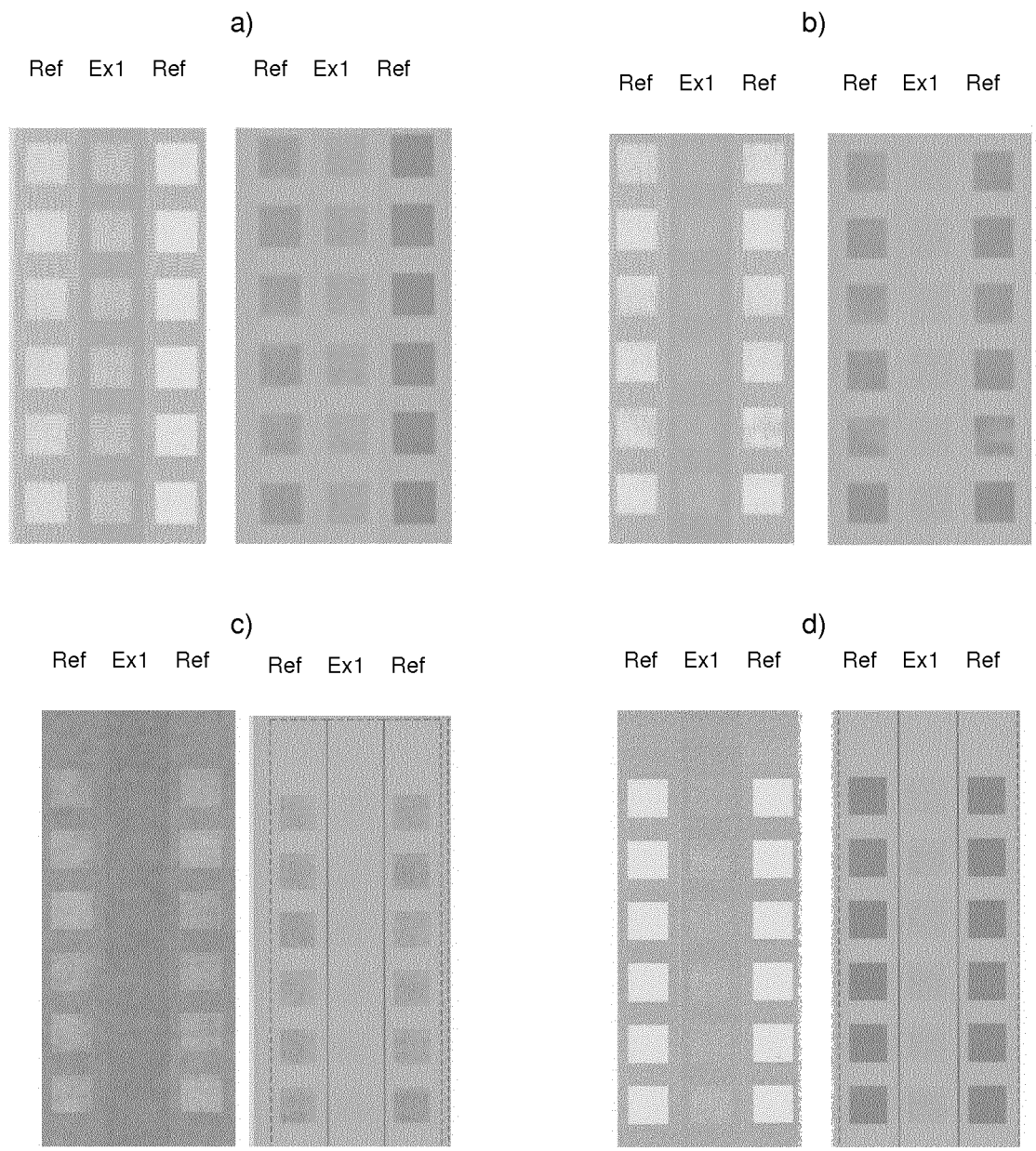
FIG. 1 shows the results of the transferability tests on images printed with inks produced according to Reference Example 1 and Examples 1 and 2 with image pages shown on the left and cleaner pages shown on the right.

Before the present disclosure is disclosed and described, it is to be understood that this disclosure is not limited to the particular process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which pigment particles, resin, charge directors and other additives can be dispersed to form a liquid electrostatic ink composition or liquid electrophotographic ink composition. The carrier liquids may include a mixture of a variety of different agents, such as surfactants, co-solvents, viscosity modifiers, and/or other possible ingredients.

As used herein, "liquid electrostatic ink composition" or "liquid electrophotographic composition" generally refers to an ink composition that is typically suitable for use in an electrostatic printing process, sometimes termed an electrophotographic printing process. It may comprise pigment particles having a thermoplastic resin thereon. The electrostatic ink composition may be a liquid electrostatic ink composition, in which the pigment particles having resin thereon are suspended in a carrier liquid. The pigment particles having resin thereon will typically be charged or capable of developing charge in an electric field, such that they display electrophoretic behaviour. A charge director may be present to impart a charge to the pigment particles having resin thereon.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, unless otherwise stated, "melt flow rate" is measured per ASTM D1238 Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the liquid electrostatic ink composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa·s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. If the melt viscosity of a particular polymer is specified, unless otherwise stated, it is the melt viscosity for that polymer alone, in the absence of any of the other components of the electrostatic composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate, such as a plastic film. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrostatic printing" is a specific type of electrostatic printing in which a liquid composition is employed in the electrophotographic process rather than a powder toner. An electrostatic printing process may involve subjecting the electrostatic composition to an electric field, for example, an electric field having a field gradient of 50-400 V/μm, or more, in some examples, 600-900V/μm, or more.

As used herein, "NVS" is an abbreviation of the term "non-volatile solids".

As used herein, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, unless otherwise stated, wt. % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect, there is provided an electrostatic ink composition. The electrostatic ink composition may comprise:
 a carrier liquid;
 a first resin comprising a copolymer of an alkylene monomer and a methacrylic acid monomer; and
 a second resin comprising a copolymer of an alkylene monomer and an acrylic acid monomer,
 wherein the second resin constitutes at least 35 wt. % of the total amount of resin.

In another aspect, there is provided a method of producing an electrostatic ink composition. The method of producing an electrostatic ink composition may comprise combining:
 a carrier liquid;
 a first resin comprising a copolymer of an alkylene monomer and a methacrylic acid monomer; and
 a second resin comprising a copolymer of an alkylene monomer and an acrylic acid monomer,
 wherein the second resin constitutes at least 35 wt. % of the total amount of resin.

In a further aspect, there is provided a printed substrate. The printed substrate may comprise:
 a plastic film;
 an electrostatically printed ink disposed on the plastic film;
 wherein the electrostatically printed ink composition comprises:
 a first resin comprising a copolymer of an alkylene monomer and a methacrylic acid monomer; and
 a second resin comprising a copolymer of an alkylene monomer and an acrylic acid monomer,
 wherein the second resin constitutes at least 35 wt. % of the total amount of resin.

Many liquid electrostatic ink compositions do not adhere well to plastic substrates. Instead, liquid electrostatically printing onto plastic substrates generally requires the application of a primer prior to printing the liquid electrostatic ink composition to allow satisfactory adhesion between the plastic film and the ink composition. The present inventors have devised a liquid electrostatic ink composition that can be printed directly onto plastic films without requiring the use of a primer. Moreover, the transferability of the liquid electrostatic ink composition through the liquid electrostatic printer, in particular the transferability of the composition from an intermediate transfer member to the plastic film substrate, was also improved.

Liquid Electrostatic Ink Composition

The liquid electrostatic ink composition comprises a carrier liquid; a first resin comprising a copolymer of an alkylene monomer and a methacrylic acid monomer; and a second resin comprising a copolymer of an alkylene monomer and an acrylic acid monomer, wherein the second resin constitutes at least 35 wt. % of the total amount of resin.

In some examples, the liquid electrostatic ink composition may further comprise a charge director. In some examples, the liquid electrostatic ink composition may further comprise a charge adjuvant. In some examples, the liquid electrostatic ink composition may further comprise a charge adjuvant and a charge director.

In some examples, the liquid electrostatic ink composition may further comprise a colorant. In some examples, the liquid electrostatic ink composition may substantially lack or lack a colorant. In some examples, the liquid electrostatic ink composition may further comprise a colorant and a charge director. In some examples, the liquid electrostatic ink composition may further comprise a colorant and a charge adjuvant. In some examples, the liquid electrostatic ink composition may further comprise a colorant, a charge adjuvant and a charge director.

In some examples, the electrostatic ink composition comprises particles dispersed in the carrier liquid, wherein the particles comprise the first resin and the second resin. In some examples, the electrostatic ink composition comprises particles dispersed in the carrier liquid, wherein the particles comprise a colorant, the first resin and the second resin. In some examples, the electrostatic ink composition comprises particles dispersed in the carrier liquid, wherein the particles comprise the first resin, the second resin and a third resin. In some examples, the electrostatic ink composition comprises particles dispersed in the carrier liquid, wherein the particles comprise a colorant, the first resin, the second resin and a third resin.

In some examples, the liquid electrostatic ink composition may also comprise other additives or a plurality of other additives.

First Resin

The first resin comprises a copolymer of an alkylene monomer and a methacrylic acid monomer.

In some examples, the alkylene monomer is a C2 to C10 alkylene monomer, in some examples, a C2 to C5 alkylene monomer. In some examples the alkylene monomer is selected from ethylene and propylene. In some examples, the alkylene monomer is ethylene.

In some examples, the methacrylic acid monomer constitutes 10 wt. % or more of the monomers of the first resin, in some examples, 11 wt. % or more of the monomers of the first resin, in some examples, 12 wt. % or more of the monomers of the first resin, in some examples, 13 wt. % or more of the monomers of the first resin, in some examples, 14 wt. % or more of the monomers of the first resin, in some examples, 15 wt. % or more of the monomers of the first resin, in some examples, 16 wt. % or more of the monomers of the first resin, in some examples, 17 wt. % or more of the monomers of the first resin, in some examples, 18 wt. % or more of the monomers of the first resin, in some examples, 19 wt. % or more of the monomers of the first resin, in some examples, 20 wt. % or more of the monomers of the first resin, in some examples, 25 wt. % or more of the monomers of the first resin, in some examples, about 30 wt. % of the monomers of the first resin. In some examples, the methacrylic acid monomer constitutes 30 wt. % or less of the monomers of the first resin, in some examples, 25 wt. % or less of the monomers of the first resin, in some examples, 20 wt. % or less of the monomers of the first resin, in some examples, 19 wt. % or less of the monomers of the first resin, in some examples, 18 wt. % or less of the monomers of the first resin, in some examples, 17 wt. % or less of the monomers of the first resin, in some examples, 16 wt. % or less of the monomers of the first resin, in some examples, 15 wt. % or less of the monomers of the first resin, in some examples, 14 wt. % or less of the monomers of the first resin, in some examples, 13 wt. % or less of the monomers of the first resin, in some examples, 12 wt. % or less of the monomers of the first resin, in some examples, 11 wt. % or less of the monomers of the first resin, in some examples, about 10 wt. % of the monomers of the first resin. In some examples, the methacrylic acid monomer constitutes 10 wt. % to 30 wt. % of the monomers of the first resin, in some examples, 11 wt. % to 25 wt. % of the monomers of the first resin, in some examples, 12 wt. % to 20 wt. % of the monomers of the first resin, in some examples, 13 wt. % to 19 wt. % of the monomers of the first resin, in some examples, 13 wt. % to 18 wt. % of the monomers of the first resin, in some examples, 14 wt. % to 17 wt. % of the monomers of the first resin, in some examples, 14 wt. % to 16 wt. % of the monomers of the first resin. In some examples, the alkylene monomer makes up the remaining weight percent of the monomers of the first resin.

In some examples, the first resin has a melt flow rate of 50 g/10 min or less, in some examples, 45 g/10 min or less, in some examples, 40 g/10 min or less, in some examples, 35 g/10 min or less, in some examples, 30 g/10 min or less, in some examples, 25 g/10 min or less, in some examples, 20 g/10 min or less, in some examples, 15 g/10 min or less, in some examples, 10 g/10 min or less, in some examples, the first resin has a melt flow rate of about 5 g/10 min. In some examples, the first resin has a melt flow rate of 5 g/10 min or more, in some examples, 10 g/10 min or more, in some examples, 15 g/10 min or more, in some examples, 20 g/10 min or more in some examples, 25 g/10 min or more, in some examples, 30 g/10 min or more, in some examples, 35 g/10 min or more, in some examples, 40 g/10 min or more, in some examples, 45 g/10 min or more, in some examples, about 50 g/10 min. In some examples, the first resin has a melt flow rate of from 5 g/10 min to 50 g/10 min, in some examples, 5 g/10 min to 45 g/10 min, in some examples, 10 g/10 min to 40 g/10 min, in some examples, 15 g/10 min to 35 g/10 min, in some examples, 20 g/10 min to 30 g/10 min. The melt flow rate can be measured by using ASTM D1238 or ISO 1133 at a temperature of 190° C. and using 2.16 kg.

The first resin constitutes at least at least 40 wt. % of the total amount of resin, in some examples, at least 45 wt. % of the total amount of resin, in some examples, at least 46 wt. % of the total amount of resin, in some examples, at least 47 wt. % of the total amount of resin, in some examples, at least 48 wt. % of the total amount of resin, in some examples, at least 49 wt. % of the total amount of resin, in some examples, at least 50 wt. % of the total amount of resin, in some examples, at least 51 wt. % of the total amount of resin, in some examples, at least 52 wt. % of the total amount of resin, in some examples, at least 53 wt. % of the total amount of resin, in some examples, at least 54 wt. % of the total amount of resin, in some examples, at least 55 wt. % of the total amount of resin, in some examples, at least 60 wt. % of the total amount of resin, in some examples, at least 65 wt. % of the total amount of resin, in some examples, about 70 wt. % of the total amount of resin. In some examples, the first resin constitutes 70 wt. % or less of the total amount of resin, in some examples, 65 wt. % or less of the total amount of resin, in some examples, 60 wt. % or less of the total amount of resin, in some examples, 55 wt. % or less of the total amount of resin, in some examples, 54 wt. % or less of the total amount of resin, in some examples, 53 wt. % or less of the total amount of resin, in some examples, 52 wt. % or less of the total amount of resin, in some examples, 51 wt. % or less of the total amount of resin, in some examples, 50 wt. % or less of the total amount of resin, in some examples, 49 wt. % or less of the total amount of resin, in some examples, 48 wt. % or less of the total amount of resin, in some examples, 47 wt. % or less of the total amount of resin, in some examples, 46 wt. % or less of the total amount of resin, in some examples, 45 wt. % or less of the total amount of resin, in some examples, about 40 wt. % of the total amount of resin. In some examples, the second resin constitutes 40 to 70 wt. % of the total amount of resin, in some examples, 40 wt. % to 65 wt. %, in some examples, 45 wt. % to 60 wt. %, in some examples, 46 wt. % to 55 wt. %, in some examples, 47 wt. % to 54 wt. %, in some examples, 48 wt. % to 53 wt. %, in some examples, 49 wt. % to 52 wt. %, in some examples, 49 wt. % to 51 wt. % of the total amount of resin.

Examples of suitable resins include the Nucrel® resins 925, 599 and 2940 from DuPont.

Second Resin

The second resin comprises a copolymer of an alkylene monomer and an acrylic acid monomer.

In some examples, the alkylene monomer is a C2 to C10 alkylene monomer, in some examples, a C2 to C5 alkylene monomer. In some examples the alkylene monomer is selected from ethylene and propylene. In some examples, the alkylene monomer is ethylene.

In some examples, the acrylic acid monomer constitutes 10 wt. % or more of the monomers of the second resin, in some examples, 11 wt. % or more of the monomers of the second resin, in some examples, 12 wt. % or more of the monomers of the second resin, in some examples, 13 wt. % or more of the monomers of the second resin, in some examples, 14 wt. % or more of the monomers of the second resin, in some examples, 15 wt. % or more of the monomers of the second resin in some examples, 16 wt. % or more of the monomers of the second resin, in some examples, 17 wt. % or more of the monomers of the second resin, in some examples, 18 wt. % or more of the monomers of the second resin, in some examples, 19 wt. % or more of the monomers of the second resin, in some examples, 20 wt. % or more of the monomers of the second resin, in some examples, 25 wt. % or more of the monomers of the second resin, in some examples, about 30 wt. % of the monomers of the second resin. In some examples, the methacrylic acid monomer constitutes 30 wt. % or less of the monomers of the second resin, in some examples, 25 wt. % or less of the monomers of the second resin, in some examples, 20 wt. % or less of the monomers of the second resin, in some examples, 19 wt. % or less, of the monomers of the second resin, in some examples, 18 wt. % or less of the monomers of the second resin, in some examples, 17 wt. % or less of the monomers of the second resin, in some examples, 16 wt. % or less of the monomers of the second resin in some examples, 15 wt. % or less of the monomers of the second resin, in some examples, 14 wt. % or less of the monomers of the second resin, in some examples, 13 wt. % or less of the monomers of the second resin, in some examples, 12 wt. % or less of the monomers of the second resin, in some examples, 11 wt. % or less of the monomers of the second resin, in some examples, about 10 wt. % or less of the monomers of the second resin. In some examples, the methacrylic acid monomer constitutes 10 wt. % to 30 wt. % of the monomers of the second resin, in some examples, 11 wt. % to 25 wt. % of the monomers of the second resin, in some examples, 12 wt. % to 20 wt. % of the monomers of the second resin, in some examples, 13 wt. % to 19 wt. % of the monomers of the second resin, in some examples, 13 wt. % to 18 wt. % of the monomers of the second resin, in some examples, 14 wt. % to 17 wt. % of the monomers of the second resin, in some examples, 14 wt. % to 16 wt. % of the monomers of the second resin. In some examples, the alkylene monomer makes up the remaining weight percent of the monomers of the second resin.

In some examples, the second resin has a melt viscosity of 15000 poise or less, in some examples, 10000 poise or less, in some examples, 1000 poise or less, in some examples, 100 poise or less, in some examples, 50 poise or less, in some examples 10 poise or less. The melt viscosity can be measured using a rheometer, e.g., a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. In some examples, the viscosity at 140° C. is 1000 centipoise (cP) or less, in some examples, 900 cP or less, in some examples, 800 cP or less, in some examples, 700 cP or less, in some examples, 600 cP or less, in some examples, 500 cP or less, in some examples, 400 cP or less, in some examples, about 300 cP. In some examples, the viscosity at 140° C. is 300 cP or more, in some examples, 400 cP or more, in some examples, 500 cP or more, in some examples, 600 cP or more, in some examples, 700 cP or more, in some examples, 800 cP or more, in some examples, 900 cP or more, in some examples, about 1000 cP. In some examples, the viscosity at 140° C. is 300 cP to 1000 cP, in some examples, 300 cP to 900 cP, in some examples, 400 cP to 800 cP, in some examples, 500 cP to 700 cP, in some examples, 550 cP to 650 cP, in some examples, 550 cP to 600 cP, in some examples, 600 cP to 650 cP.

In some examples, the second resin has an acidity of 50 mg KOH/g or more, in some examples, 60 mg KOH/g or more, in some examples, 70 mg KOH/g or more, in some examples, 80 mg KOH/g or more, in some examples, 90 mg KOH/g or more, in some examples, 100 mg KOH/g or more, in some examples, 110 mg KOH/g or more, in some examples, 120 mg KOH/g, in some examples, 130 mg KOH/g or more, in some examples, 140 mg KOH/g or more, in some examples, 150 mg KOH/g or more, in some examples, 160 mg KOH/g or more, in some examples, 170 mg KOH/g or more, in some examples, 180 mg KOH/g or more, in some examples, about 190 mg KOH/g. In some examples, the second resin has an acidity of 190 mg KOH/g or less, in some examples, 180 mg KOH/g or less, in some examples, 170 mg KOH/g or less, in some examples, 160 mg KOH/g or less, in some examples, 150 mg KOH/g or less, in some examples, 140 mg KOH/g or less, in some examples, 130 mg KOH/g or less, in some examples, 120 mg KOH/g or less, in some examples, 110 mg KOH/g or less, in some examples, 100 mg KOH/g or less, in some examples, 90 mg KOH/g or less, in some examples, 80 mg KOH/g or less, in some examples, 70 mg KOH/g or less, in some examples, 60 mg KOH/g or less, in some example about 50 mg KOH/g. In some examples, the second resin has an acidity of 50 mg KOH/g to 190 mg KOH/g, in some examples, 60 mg KOH/g to 180 mg KOH/g, in some examples, 70 mg KOH/g to 170 mg KOH/g, in some examples, 80 mg KOH/g to 160 mg KOH/g, in some examples, 90 mg KOH/g to 150 mg KOH/g, in some examples, 100 mg KOH/g to 140 mg KOH/g, in some examples, 110 mg KOH/g to 130 mg KOH/g.

The second resin constitutes at least 35 wt. % of the total amount of resin. In some examples, the second resin constitutes at least 40 wt. % of the total amount of resin, in some examples, at least 45 wt. % of the total amount of resin, in some examples, at least 46 wt. % of the total amount of resin, in some examples, at least 47 wt. % of the total amount of resin, in some examples, at least 48 wt. % of the total amount of resin, in some examples, at least 49 wt. % of the total amount of resin, in some examples, at least 50 wt. % of the total amount of resin, in some examples, at least 51 wt. % of the total amount of resin, in some examples, at least 52 wt. % of the total amount of resin, in some examples, at least 53 wt. % of the total amount of resin, in some examples, at least 54 wt. % of the total amount of resin, in some examples, at least 55 wt. % of the total amount of resin, in some examples, at least 60 wt. % of the total amount of resin, in some examples, at least 65 wt. % of the total amount of resin, in some examples, about 70 wt. % of the total amount of resin. In some examples, the second resin constitutes 70 wt. % or less of the total amount of resin, in some examples, 65 wt. % or less of the total amount of resin, in some examples, 60 wt. % or less of the total amount of resin, in some examples, 55 wt. % or less of the total amount of resin, in some examples, 54 wt. % or less of the total amount of resin, in some examples, 53 wt. % or less of the total amount of resin, in some examples, 52 wt. % or less of the total amount of resin, in some examples, 51 wt. % or less of the total amount of resin, in some examples, 50 wt. % or less of the total amount of resin, in some examples, 49 wt. % or less of the total amount of resin, in some examples, 48 wt. % or less of the total amount of resin, in some examples, 47 wt. % or less of the total amount of resin, in some examples, 46 wt. % or less of the total amount of resin, in some examples, 45 wt. % or less of the total amount of resin, in some examples, 40 wt. % or less of the total amount of resin, in some examples, about 35 wt. % of the total amount of resin. In some examples, the second resin constitutes 35 to 70 wt. % of the total amount of resin, in some examples, 40 wt. % to 65 wt. %, in some examples, 45 wt. % to 60 wt. %, in some examples, 46 wt. % to 55 wt. %, in some examples, 47 wt. % to 54 wt. %, in some examples, 48 wt. % to 53 wt. %, in some examples, 49 wt. % to 52 wt. %, in some examples, 49 wt. % to 51 wt. % of the total amount of resin. In some examples, the first resin makes up the remaining amount of the resin. In some examples, the first resin and the third resin make up the remaining amount of the resin.

An example of a suitable resin is the AC® 5120 resin from Honeywell.

Third Resin

In some examples, the electrostatic ink composition comprises a third resin. In some examples, the third resin comprises a copolymer of an alkylene monomer and a vinyl ester monomer.

In some examples, the alkylene monomer is a C2 to C10 alkylene monomer, in some examples, a C2 to C5 alkylene monomer. In some examples the alkylene monomer is selected from ethylene and propylene. In some examples, the alkylene monomer is ethylene.

In some examples, the vinyl ester monomer is selected from vinyl acetate, vinyl propanoate, vinyl butanoate, vinyl 2-methylpropanoate, vinyl pentanoate, vinyl 2-methylbutanoate, vinyl 3-methylbutanoate, vinyl hexanoate, vinyl 2-methylpentanoate, vinyl 3-methylpentanoate, vinyl 4-methylpentanoate, vinyl 2-ethylbutanoate, vinyl heptanoate, vinyl 2-methylhexanoate, vinyl 3-methylhexanoate, vinyl 4-methylhexanoate, vinyl 5-methylhexanoate, vinyl 2-ethylpentanoate, vinyl 3-ethylpentanoate, vinyl ocatanoate, vinyl 2-methylheptanoate, vinyl 3-methylheptanoate, vinyl 4-methylheptanoate, vinyl 5-methylheptanoate, vinyl 6-methylheptanoate, vinyl 2-ethylhexanoate, vinyl 3-ethylhexanoate, vinyl 4-ethylhexanoate, vinyl 2-propylpentanoate.

In some examples, the vinyl ester monomer constitutes 5 wt. % or more of the monomers of the third resin, in some examples, 10 wt. % or more of the monomers of the third resin, in some examples, 15 wt. % or more of the monomers of the third resin, in some examples, 20 wt. % or more of the monomers of the third resin, in some examples, 23 wt. % or more of the monomers of the third resin, in some examples, 24 wt. % or more of the monomers of the third resin, in some examples, 25 wt. % or more of the monomers of the third resin, in some examples 26 wt. % or more of the monomers of the third resin, in some examples, 27 wt. % or more of the monomers of the third resin, in some examples, 28 wt. % or more of the monomers of the third resin, in some examples, 29 wt. % or more of the monomers of the third resin, in some examples, 30 wt. % or more of the monomers of the third resin, in some examples, 31 wt. % or more of the monomers of the third resin, in some examples, 32 wt. % or more of the monomers of the third resin, in some examples, 33 wt. % or more of the monomers of the third resin, in some examples, 34 wt. % or more of the monomers of the third resin, in some examples, 35 wt. % or more of the monomers of the third resin, in some examples, about 40 wt. % of the monomers of the third resin. In some examples, the vinyl ester monomer constitutes 40 wt. % or less of the monomers of the third resin, in some examples, 35 wt. % or less of the monomers of the third resin, in some examples, 34 wt. % or less of the monomers of the third resin, in some examples, 33 wt. % or less of the monomers of the third resin, in some examples, 32 wt. % or less of the monomers of the third resin, in some examples, 31 wt. % or less of the monomers of the third resin, in some examples, 30 wt. % or less of the monomers of the third resin, in some examples, 29 wt. % or less of the monomers of the third resin, in some examples, 28 wt. % or less of the monomers of the third resin, in some examples, 27 wt. % or less of the monomers of the third resin, in some examples, 26 wt. % or less of the monomers of the third resin, in some examples, 25 wt. % or less of the monomers of the third resin, in some examples, 24 wt. % or less of the monomers of the third resin, in some examples, 23 wt. % or less of the monomers of the third resin, in some examples, 20 wt. % or less of the monomers of the third resin, in some examples, 15 wt. % or less of the monomers of the third resin, in some examples, 10 wt. % or less of the monomers of the third resin, in some examples, about 5 wt. % of the monomers of the third resin. In some example, the vinyl ester monomer constitutes 5 wt. % to 40 wt. %, in some examples, 10 wt. % to 35 wt. %, in some examples, 15 wt. % to 30 wt. %, in some examples, 20 wt. % to 34 wt. %, in some examples, 23 wt. % to 33 wt. %, in some examples, 24 wt. % to 32 wt. %, in some examples, 25 wt. % to 31 wt. %, in some examples, 26 wt. % to 30 wt. %, in some examples, 27 wt. % to 29 wt. % of the monomers of the third resin. In some examples, the alkylene monomer makes up the remaining weight percent of the third resin.

In some examples, the third resin has a melt flow rate of 500 g/10 min or less, in some examples, 490 g/10 min or less, in some examples, 480 g/10 min or less, in some examples 470 g/10 min or less, in some examples, 460 g/10 min or less, in some examples, 450 g/10 min or less, in some examples, 440 g/10 min or less, in some examples, 430 g/10 min or less, in some examples, 420 g/10 min or less, in some examples, 410 g/10 min or less, in some examples, 400 g/10 min, in some examples, 390 g/10 min or less, in some examples, 380 g/10 min or less, in some examples, 370 g/10 min or less, in some examples, 360 g/10 min or less, in some examples, 350 g/10 min or less, in some examples, 340 g/10 min or less, in some examples, 330 g/10 min or less, in some examples, 320 g/10 min or less, in some examples, 310 g/10 min or less, in some examples, about 300 g/10 min. In some examples the third resin has a melt flow rate of 300 g/10 min or more, in some examples, 310 g/10 min or more, in some examples, 320 g/10 min or more, in some examples, 330 g/10 min or more, in some examples, 340 g/10 min or more, in some examples, 350 g/10 min or more, in some examples, 360 g/10 min or more, in some examples, 370 g/10 min or more, in some examples, 380 g/10 min or more, in some examples, 390 g/10 min or more, in some examples, 400 g/10 min or more, in some examples, 410 g/10 min or more, in some examples, 420 g/10 min or more, in some examples, 430 g/10 min or more, in some examples, 440 g/10 min or more, in some examples, 450 g/10 min or more, in some examples, 460 g/10 min or more, in some examples, 470 g/10 min or more, in some examples, 480 g/10 min or more, in some examples, 490 g/10 min or more, in some examples, about 500 g/10 min. In some examples, the third resin has a melt flow rate of 300 g/10 min to 500 g/10 min, in some examples, 310 g/10 min to 490 g/10 min, in some examples 320 g/10 min to 480 g/10 min, in some examples, 330 g/10 min to 470 g/10 min, in some examples, 340 g/10 min to 460 g/10 min, in some examples, 350 g/10 min to 450 g/10 min, in some examples, 360 g/10 min to 440 g/10 min, in some examples, 370 g/10 min to 430 g/10 min, in some examples, 380 g/10 min to 420 g/10 min, in some examples, 390 g/10 min to 410 g/10 min.

In some examples, no third resin is used in the liquid electrostatic ink composition. In some examples, the third resin constitutes 0.5 wt. % or more of the total amount of resin, in some examples, 1 wt. % or more of the total amount of resin, in some examples, 1.5 wt. % or more of the total amount of resin, in some examples, 2 wt. % or more of the total amount of resin, in some examples, 2.5 wt. % or more of the total amount of resin, in some examples, 3 wt. % or more of the total amount of resin, in some examples, 3.5 wt. % or more of the total amount of resin, in some examples, 4 wt. % or more of the total amount or resin, in some examples, 4.5 wt. % or more of the total amount of resin, in some examples, 5 wt. % or more of the total amount of resin, in some examples, 5.5 wt. % or more of the total amount of resin, in some examples, 6 wt. % or more of the total amount of resin, in some examples, 6.5 wt. % or more of the total amount of resin, in some examples, 7 wt. % or more of the total amount of resin, in some examples, 7.5 wt. % or more of the total amount of resin, in some examples, 8 wt. % or more of the total amount of resin, in some examples, 8.5 wt. % or more of the total amount of resin, in some examples, 9 wt. % or more of the total amount of resin, in some examples, 9.5 wt. % or more of the total amount of resin, in some examples, about 10 wt. % of the total amount of resin. In some examples, the third resin constitutes 10 wt. % or less of the total amount of resin, in some examples, 9.5 wt. % or less of the total amount of resin, in some examples, 9 wt. % or less of the total amount of resin, in some examples, 8.5 wt. % or less of the total amount of resin, in some examples, 8 wt. % or less of the total amount of resin, in some examples, 7.5 wt. % or less of the total amount of resin, in some examples, 7 wt. % or less of the total amount of resin, in some examples, 6.5 wt. % or less of the total amount of resin, in some examples, 6 wt. % or less of the total amount of resin, in some examples, 5.5 wt. % or less of the total amount of resin, in some examples, 5 wt. % or less of the total amount of resin, in some examples, 4.5 wt. % or less of the total amount of resin, in some examples, 4 wt. % or less of the total amount of resin, in some examples, 3.5 wt. % or less of the total amount of resin, in some examples, 3 wt. % or less of the total amount of resin, in some examples, 2.5 wt. % or less of the total amount of resin, in some examples, 2 wt. % or less of the total amount of resin, in some examples, 1.5 wt. % or less of the total amount of resin, in some examples, about 1 wt. % or less of the total amount of resin, in some examples, about 0.5 wt. % or less of the total amount of resin. In some examples, the third resin constitutes 0 wt. % to 10 wt. % of the total amount of resin, in some examples, 0.5 wt. % to 9.5 wt. %, in some examples, 1 wt. % to 9 wt. %, in some examples, 1.5 wt. % to 8.5 wt. %, in some examples, 2 wt. % to 8 wt. %, in some examples, 2.5 wt. % to 7.5 wt. %, in some examples, 3 wt. % to 7 wt. %, in some examples, 3.5 wt. % to 6.5 wt. %, in some examples, 4 wt. % to 6 wt. %, in some examples, 4.5 wt. % to 5.5 wt. % of the total amount of resin. In some examples, the first resin and the second resin make up the remaining amount of the resin.

An example of a suitable resin is the Elvax® 210W resin from DuPont.

Carrier Liquid

The electrostatic ink composition comprises a carrier liquid.

The carrier liquid can include or be a hydrocarbon, silicone oil, vegetable oil, etc. The carrier liquid can include, for example, an insulating, non-polar, non-aqueous liquid that can be used as a medium for ink particles, i.e., the ink particles comprising the first resin and the second resin and, in some examples, the third resin and/or a colorant. The carrier liquid can include compounds that have a resistivity in excess of about $10^9$ ohm·cm. The carrier liquid may have a dielectric constant below about 5, in some examples, below about 3. The carrier liquid can include hydrocarbons. The hydrocarbon can include, for example, an aliphatic hydrocarbon, an isomerized aliphatic hydrocarbon, branched chain aliphatic hydrocarbons, aromatic hydrocarbons, and combinations thereof. Examples of the carrier liquid include, for example, aliphatic hydrocarbons, isoparaffinic compounds, paraffinic compounds, dearomatized hydrocarbon compounds, and the like. In particular, the carrier liquid can include, for example, Isopar-G™, Isopar-H™, Isopar-L™, Isopar-M™, Isopar-K™, Isopar-V™, Norpar 12™, Norpar13™, Norpar15™, Exxol D40™, Exxol D80™, Exxol D100™ Exxol D130™, and Exxol D140™ (each sold by EXXON CORPORATION); Teclen N-16™, Teclen N-20™, Teclen N-22™, Nisseki Naphthesol L™, Nisseki Naphthesol M™ Nisseki Naphthesol H™, #0 Solvent L™, #0 Solvent M™, #0 Solvent H™, Nisseki Isosol 300™, Nisseki Isosol 400™, AF-4™, AF-S™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The carrier liquid can constitute about 20% to 99.5% by weight of the electrostatic ink composition, in some examples, 50% to 99.5% by weight of the electrostatic ink composition. The carrier liquid may constitute about 40 to 90% by weight of the electrostatic ink composition. The carrier liquid may constitute about 60% to 80% by weight of the electrostatic ink composition. The carrier liquid may constitute about 90% to 99.5% by weight of the electrostatic ink composition, in some examples, 95% to 99% by weight of the electrostatic ink composition.

The electrostatic ink composition, when printed on a print substrate, for example, a plastic film, may be substantially free from carrier liquid. In an electrostatic printing process and/or afterwards, the carrier liquid may be removed, for example, by an electrophoresis processes during printing and/or evaporation, such that substantially just solids are transferred to the print substrate, for example, a plastic film. Substantially free from carrier liquid may indicate that the ink printed on the print substrate contains less than 5 wt. % carrier liquid, in some examples, less than 2 wt. % carrier liquid, in some examples, less than 1 wt. % carrier liquid, in some examples, less than 0.5 wt. % carrier liquid. In some examples, the ink printed on the print substrate, for example, a plastic film, is free from carrier liquid.

Charge Director

In some examples, the liquid electrostatic ink composition includes a charge director. The charge director may be added to a liquid electrostatic ink composition in order to impart and/or maintain sufficient electrostatic charge on the resin particles. In some examples, the charge director may comprise ionic compounds, particularly metal salts of fatty acids, metal salts of sulfosuccinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g., neutral Calcium Petronate™, neutral Barium Petronate™ and basic Barium Petronate™), polybutylene succinimides (e.g. OLOA™ 1200 and Amoco 575), and glyceride salts (e.g., sodium salts of phosphated mono- and diglycerides with unsaturated and saturated acid substituents), sulfonic acid salts including, but not limited to, barium, sodium, calcium, and aluminium salts of sulfonic acid. The sulfonic acids may include, but are not limited to, alkyl sulfonic acids, aryl sulfonic acids, and sulfonic acids of alkyl succinates. The charge director can impart a negative charge or a positive charge on the resin-containing particles of a liquid electrostatic ink composition.

The charge director may be added in order to impart and/or maintain sufficient electrostatic charge on the ink particles, which may be particles comprising the first resin and the second resin.

In some examples, the electrostatic ink composition comprises a charge director comprising a simple salt. The ions constructing the simple salts are all hydrophilic. The simple salt may include a cation selected from the group consisting of Mg, Ca, Ba, $NH_4$, tert-butyl ammonium, $Li^+$, and $Al^{3+}$, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), $Cl^-$, $BF_4^-$, $F^-$, $ClO_4^-$, and $TiO_3^{4-}$ or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, LiTFA, $Al_2(SO_4)_3$, $LiClO_4$ and $LiBF_4$, or any sub-group thereof.

In some examples, the electrostatic ink composition comprises a charge director comprising a sulfosuccinate salt of the general formula $MA_n$, wherein M is a metal, n is the valence of M, and A is an ion of the general formula (I): $[R^1—O—C(O)CH_2CH(SO_3^-)—C(O)—O—R^2]$, wherein each of $R^1$ and $R^2$ is an alkyl group. In some examples each of $R^1$ and $R^2$ is an aliphatic alkyl group. In some examples, each of $R^1$ and $R^2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R^1$ and $R^2$ are the same. In some examples, at least one of $R^1$ and $R^2$ is $C_{13}H_{27}$. In some examples, M is Na, K, Cs, Ca, or Ba.

In some examples, the charge director comprises at least one micelle forming salt and nanoparticles of a simple salt as described above. The simple salts are salts that do not form micelles by themselves, although they may form a core for micelles with a micelle forming salt. The sulfosuccinate salt of the general formula MAR is an example of a micelle forming salt. The charge director may be substantially free of an acid of the general formula HA, where A is as described above. The charge director may include micelles of said sulfosuccinate salt enclosing at least some of the nanoparticles of the simple salt. The charge director may include at least some nanoparticles of the simple salt having a size of 200 nm or less, and/or in some examples, 2 nm or more.

The charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a C21-26 hydrocarbon alkyl, and can be obtained, for example, from Chemtura. An example isopropyl amine sulfonate salt is dodecyl benzene sulfonic acid isopropyl amine, which is available from Croda.

In some examples, the charge director constitutes about 0.001% to about 20%, in some examples, about 0.01% to about 20% by weight, in some examples, about 0.01 to about 10% by weight, in some examples, about 0.01% to about 1% by weight of the solids of an electrostatic ink composition. In some examples, the charge director constitutes about 0.001% to about 0.15% by weight of the solids of the electrostatic ink composition, in some examples, about 0.001% to about 0.15%, in some examples, about 0.001% to about 0.02% by weight of the solids of an electrostatic ink composition, in some examples, about 0.1% to about 2% by weight of the solids of the electrostatic ink composition, in some examples, about 0.2% to about 1.5% by weight of the solids of the electrostatic ink composition, in some examples, about 0.1% to about 1% by weight of the solids of the electrostatic ink composition, in some examples, about 0.2% to about 0.8% by weight of the solids of the electrostatic ink composition.

In some examples, the charge director is present in an amount of from about 3 mg/g to about 80 mg/g, in some examples, 3 mg/g to about 50 mg/g, in some examples, 3 mg/g to about 20 mg/g, in some examples, from about 3 mg/g to about 15 mg/g, in some examples, from about 10 mg/g to about 15 mg/g, in some examples, from about 5 mg/g to about 10 mg/g (where mg/g indicates mg per gram of solids of the electrostatic ink composition).

Charge Adjuvant

In some examples, the liquid electrostatic ink composition includes a charge adjuvant. A charge adjuvant may promote charging of the particles when a charge director is present. The method of producing an electrostatic ink composition, as described herein, may involve adding a charge adjuvant at any stage. The charge adjuvant can include, for example, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethyl-hexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. In some examples, the charge adjuvant is VCA (an aluminium stearate, available from Sigma Aldrich).

In some examples, the electrostatic ink composition further includes a salt of a multivalent cation and a fatty acid anion. The salt of a multivalent cation and a fatty acid anion can act as a charge adjuvant. The multivalent cation may, in some examples, be a divalent or a trivalent cation. In some examples, the multivalent cation is selected from Group 2, transition metals, Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is $Al^{3+}$. The fatty acid anion may be selected from a saturated or unsaturated fatty acid anion. The fatty acid anion may be a C8 to C26 fatty acid anion, in some examples, a C14 to C22 fatty acid anion, in some examples, a $C_{16}$ to C20 fatty acid anion, in some examples, a C17, C18 or C19 fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant may be present in an amount of about 0.1% to about 5% by weight, in some examples, about 0.1% to about 1% by weight, in some examples, about 0.3% to about 0.8% by weight of the solids of the electrostatic ink composition, in some examples, about 1 wt. % to about 3 wt. % of the solids of the electrostatic ink composition, in some examples, about 1.5 wt. % to about 2.5 wt. % of the solids of the electrostatic ink composition.

The charge adjuvant may be present in an amount of about 5.0% by weight or less of total solids of the electrostatic ink composition, in some examples, in an amount of about 4.5% by weight or less, in some examples, in an amount of about 4.0% by weight or less, in some examples, in an amount of about 3.5% by weight or less, in some examples, in an amount of about 3.0% by weight or less, in some examples, in an amount of about 2.5% by weight or less, in some examples, about 2.0% or less by weight of the solids of the electrostatic ink composition.

The charge adjuvant, which may, for example, be or include a salt of a multivalent cation and a fatty acid anion, may be present in an amount of about 0.1 wt. % to about 5 wt. % of the solids of the electrostatic ink composition, in some examples, in an amount of about 0.1 wt. % to about 2 wt. % of the solids of the electrostatic ink composition, in some examples, in an amount of about 0.3 wt. % to about 1.5 wt. % of the solids of the electrostatic ink composition, in some examples, about 0.5 wt. % to about 1.2 wt. % of the solids of the electrostatic ink composition, in some examples, about 0.8 wt. % to about 1 wt. % of the solids of the electrostatic ink composition, in some examples, about 1 wt. % to about 3 wt. % of the solids of the electrostatic ink composition, in some examples, about 1.5 wt. % to about 2.5 wt. % of the solids of the electrostatic ink composition.

Colorant

The electrostatic ink composition may include a colorant. In some examples, the colorant may be a dye or pigment.

The electrostatic ink composition may substantially lack or lack a colorant. The electrostatic ink composition may be a transparent electrostatic ink composition. In some examples, the transparent electrostatic ink composition does not contain any colorant, or substantially lacks colorant and thus is a colorant-free composition or substantially colorant-free composition. The transparent electrostatic ink composition may otherwise be termed a colourless electrostatic ink composition or a colourless varnish for electrostatic printing. In some examples, substantially lacks may indicate that the transparent electrostatic ink composition comprises 5 wt. % solids or less of colorant, in some examples, 3 wt. % solids or less of colorant, in some examples, 1 wt. % solids or less of colorant. "Colorant" may be a material that imparts a colour to the ink composition. As used herein, "colorant" includes pigments and dyes, such as those that impart colours, such as black, magenta, cyan, yellow and white to an ink. As used herein, "pigment" generally includes pigment colorants, magnetic particles, aluminas, silicas, and/or other ceramics or organometallics. Thus, though the present description primarily exemplifies the use of pigment colorants, the term "pigment" can be used more generally to describe not only pigment colorants, but also other pigments such as organometallics, ferrites, ceramics, and so forth.

The colorant can be any colorant compatible with the carrier liquid and useful for electrostatic printing. For example, the colorant may be present as pigment particles, or may comprise a resin as described herein and a pigment. The pigments can be any of those standardly used in the art. In some examples, the colorant is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW 5GT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. If the pigment is a white pigment particle, the pigment particle may be selected from the group consisting of $TiO_2$, calcium carbonate, zinc oxide, and mixtures thereof. In some examples, the white pigment particle may comprise an alumina-$TiO_2$ pigment.

The colorant or pigment may be present in the electrostatic ink composition in an amount of from 10 wt. % to 80 wt. % of the total amount of resin and colorant, in some examples, 15 wt. % to 80 wt. %, in some examples 15 wt. % to 60 wt. %, in some examples, 15 wt. % to 50 wt. %, in some examples, 15 wt. % to 40 wt. %, in some examples, 15 wt. % to 30 wt. % of the total amount of resin and colorant. In some examples, the colorant or pigment particle may be present in the electrostatic ink in an amount of at least 50 wt. % of the total amount of resin and colorant or pigment, for example at least 55 wt. % of the total amount of resin and colorant or pigment.

Other Additives

The electrostatic ink composition may include other additives or a plurality of other additives. The other additive or plurality of other additives may be added at any stage of the method of producing an electrostatic ink composition. The other additive or plurality of other additives may be selected from a charge adjuvant, a wax, a surfactant, viscosity modifiers, and compatibility additives. The wax may be an incompatible wax. As used herein, "incompatible wax" may refer to a wax that is incompatible with the resin. Specifically, the wax phase separates from the resin phase upon cooling of the resin fused mixture on a print substrate, for example, a plastic film, during and after the transfer of the ink film to the print substrate, for example, from an intermediate transfer member, which may be a heated blanket.

Method of Producing an Electrostatic Ink Composition

Also provided is a method of producing an electrostatic ink composition. The method comprises combining a carrier liquid, a first resin and a second resin, wherein the second resin constitutes at least 35 wt. % of the total amount of resin. In some examples, the method comprises combining a carrier liquid, a first resin, a second resin and a third resin, wherein the second resin constitutes at least 35 wt. % of the total amount of resin.

In some examples, the method may comprise suspending a first resin and a second resin in a carrier liquid. In some examples, the method may comprise suspending a first resin, a second resin and a third resin in a carrier liquid. In some examples, the electrostatic ink comprises chargeable particles comprising a first resin and a second resin. In some examples, the electrostatic ink comprises chargeable particles comprising a first resin, a second resin and a third resin. In some examples, the method may comprise suspending chargeable particles comprising a first resin and a second resin in a carrier liquid. In some examples, the method may comprise suspending chargeable particles comprising a first resin, a second resin and a third resin in a carrier liquid.

In some examples, the method may comprise dispersing a first resin and a second resin in a carrier liquid. In some examples, the method may comprise dispersing a first resin, a second resin and a third resin in a carrier liquid. In some examples, the method may comprise dispersing chargeable particles comprising a first and second resin in a carrier liquid. In some examples, the method may comprise dispersing chargeable particles comprising a first resin, a second resin and a third resin in a carrier liquid.

In some examples, the method comprises combining a resin (for example, the first resin) with the carrier liquid and subsequently adding the other resin or resins (the second resin and optionally the third resin). In some examples, the method comprises combining a resin (for example, the first resin) with the carrier liquid to form a paste and subsequently adding the other resin or resins (the second resin and optionally the third resin). In some examples, the resin and the carrier liquid are combined and heated to an elevated temperature before adding the other resin(s), which may have also been heated to an elevated temperature. In some examples, the resin and the carrier liquid are combined and heated to a temperature above the melting point of the resin before adding the other resin(s), which may have also been heated to a temperature above their melting points. In some examples, the resin and carrier liquid are combined and heated until the resin has melted and/or dissolved in the carrier liquid before adding the other resin(s). In some examples, adding the other resin(s) to the combined resin and carrier liquid comprises mixing the other resin(s) with the combined resin and carrier liquid.

The melting point of the resin may be determined by differential scanning calorimetry, for example, using ASTM D3418.

In some examples, the resin and the carrier liquid are combined and heated to a temperature of at least 70° C., for example, at least 80° C., for example, at least 90° C., for example, at least 100° C., for example, at least 110° C., for example, at least 120° C., for example, 130° C., for example, to melt the resin. In some examples, the other resin(s) is(are) heated before being added to the combined resin and carrier liquid. In some examples, the other resin(s) is(are) heated to at least 30° C., in some examples, at least 40° C., in some examples, at least 45° C., in some examples, at least 50° C. before being added to the combined resin and carrier liquid.

In some examples, the other resin(s) is(are) heated to 100° C. or less, in some examples, 90° C. or less, in some examples, 80° C. or less, in some examples, 75° C. or less, in some examples, 70° C. or less, in some examples, 60° C. or less before being added to the combined resin and carrier liquid. In some examples, the other resin(s) is(are) heated to reduce the viscosity of the other resin(s) before being added to the first resin and the carrier liquid.

In some examples, the method comprises combining the first resin with the carrier liquid to form a first composition; combining the second resin with the carrier liquid to form a second composition; optionally, combining the third resin with the carrier liquid to form a third composition; and subsequently combining the first composition, the second composition, and optionally the third composition) to form an electrostatic ink composition. In some examples, the method comprises combining the first resin with the carrier liquid to form a first paste; combining the second resin with the carrier liquid to form a second paste; optionally, combining the third resin with the carrier liquid to form a third paste; and subsequently combining the first paste, the second paste and optionally the third paste to form an electrostatic ink composition. In some examples, the first resin and the carrier liquid are combined and heated to an elevated temperature to form a first heated composition; the second resin and the carrier liquid are combined and heated to an elevated temperature to form a second heated composition; optionally, the third resin and the carrier liquid are combined and heated to an elevated temperature to form a third composition; and subsequently the first heated composition, the second heated composition and the third heated composition are combined. In some examples, the first resin and the carrier liquid are combined and heated to a temperature above the melting point of the first resin to form a first heated composition; the second resin and the carrier liquid are combined and heated to a temperature above the melting point of the second resin to form a second heated composition; optionally the third resin and the carrier liquid are combined and heated to a temperature above the melting point of the third resin to form a third heated composition; and subsequently the first heated composition, the second heated composition and optionally the third heated composition are combined. In some examples, the first composition, the second composition and, if present, the third composition are heated to the same temperature, which may be a temperature above the melting temperature of all of the resins.

In some examples, the method comprises mixing the first resin, the second resin and optionally the third resin together and then combining the mixture of the resins with the carrier liquid.

In some examples, the first resin, the second resin and optionally the third resin are combined with the carrier liquid and subsequently heated to an elevated temperature. In some examples, the first resin, the second resin and optionally the third resin, are combined with the carrier liquid and subsequently heated to a temperature above the melting point of at least one, optionally both, optionally all, of the resins. In some examples, the first resin, the second resin and optionally the third resin are combined with the carrier liquid and subsequently heated to a temperature of at least 70° C., for example, at least 80° C., for example, at least 90° C., for example, at least 100° C., for example, at least 110° C., for example, at least 120° C., for example, 130° C., for example, to melt at least one, optionally both, optionally all, of the resins. In some examples, the combined first resin, second resin, optional third resin and carrier liquid are heated until all of the resins have melted and/or dissolved in the carrier liquid.

In some examples, the method of producing an electrostatic ink composition comprises combining a first resin, a second resin, a third resin and a carrier liquid. In some examples, the third resin is added at any stage in the method.

In some examples, the chargeable particles comprise the first resin, the second resin and the third resin.

Melting and/or dissolving a resin (or resins) in the carrier liquid may result in the carrier fluid appearing clear and homogeneous. In some examples, the resin (or resins) and carrier liquid are heated before, during or after mixing.

In some examples, the resin (or resins) and the carrier liquid are mixed at a mixing rate of 500 rpm or less, for example, 400 rpm or less, for example, 300 rpm or less, for example, 200 rpm or less, for example, 100 rpm or less, for example, 75 rpm or less, for example, 50 rpm. In some examples, mixing may continue until melting and/or dissolution of the resin (or resins) in the carrier liquid is complete.

In some examples, after combining and heating the resins and the carrier liquid, the mixture is cooled to a temperature below the melting point of the resins, for example, to room temperature. In some examples, the chargeable particles are removed from the carrier liquid and re-dispersed in a new portion of carrier liquid, which may be the same or a different carrier liquid.

In some examples, the method comprises adding a colorant to the combined first resin, second resin, optional third resin and carrier liquid. In some examples, the method comprises adding a colorant to the combined first resin, second resin, optional third resin and carrier liquid to form chargeable particles comprising the resins and a colorant. In some examples, the method comprises grinding the colorant and the resins in the presence of the carrier liquid to form a paste. In some examples, the method comprises heating and mixing the colorant and the resins in the presence of the carrier liquid to form a paste.

In some examples, the method comprises adding a charge adjuvant to the combined first resin, second resin, optional third resin and carrier liquid and optionally grinding. In some examples, the method comprises adding a charge adjuvant and a colorant to the combined first resin, second resin, optional third resin and carrier liquid and optionally grinding.

In some examples, the method comprises grinding at a grinding speed of at least 50 rpm. In some examples, the method comprises grinding at a grinding speed of up to about 600 rpm. In some examples, the method comprises grinding for at least 1 h, in some examples, for at least 2 h. In some examples, the method comprises grinding for up to about 12 h. In some examples, the method comprises grinding at a temperature of at least about 30° C., for example, at least about 35° C., for example, at least about 40° C., for example, at least about 50° C. In some examples, the method comprises grinding at a temperature of at least about 50° C. for a first time period, in some examples, for at least 1 h, in some examples, for at least 1.5 h and then reducing the temperature to a temperature of at least 30° C., in some examples, at least 35° C. and continuing grinding for at least 5 h, in some examples, at least 9 h, in some examples, at least 10 h.

In some examples, the method comprises adding a charge director to the combined first resin, second resin, optional third resin and carrier liquid.

Method of Producing a Printed Substrate

Also provided is a method of producing a printed article, the method comprising applying an electrostatic ink composition (described above) to a substrate with an electrostatic printer. During the printing, the electrostatic ink composition is a liquid electrostatic ink composition.

In some examples, the method comprises electrostatically printing a liquid electrostatic ink composition (described above) on a substrate with a liquid electrostatic printer.

In some examples, liquid electrostatically printing a liquid electrostatic ink composition comprises contacting the liquid electrostatic ink composition with a latent electrostatic image on a surface to create a developed image and transferring the developed image to a substrate, in some examples, via an intermediate transfer member. In some examples, the method does not include a step of printing a primer onto the substrate.

The substrate onto which the ink composition is applied may be a plastic film. In some examples, the substrate onto which the ink composition is applied may comprise a polymeric material. In some examples, the substrate may be any plastic film capable of having an image printed thereon. The plastic film may include a synthetic polymeric material, for example, a polymer formed from alkylene monomers, including, for example, polyethylene and polypropylene, and co-polymers such as styrene-polybutadiene polymers. The polypropylene may, in some examples, be biaxially orientated polypropylene. In some examples, the plastic film may comprise polyethylene terephthalate.

In some examples, the plastic film is a thin film. In some examples, the plastic film comprises polyethylene (PE), linear low density polyethylene (LLDPE), low density polyethylene (LDPE), medium density polyethylene (MDPE), high density polyethylene (HDPE), polypropylene (PP), cast (cPP) or biaxially oriented polypropylene (BOPP), oriented polyamide (OPA), or polyethylene terephthalate (PET).

In some examples, the substrate comprises a plurality of layers of material laminated together to form a pre-laminated substrate in which a plastic film forms the surface onto which electrostatic ink can be applied. In some examples, the substrate comprises a plurality of layers of film laminated together to form a pre-laminated substrate in which a plastic film forms the surface onto which electrostatic ink can be applied. In an example, the substrate may be a plastic film laminated to, adhered to or coated on a cellulosic paper. In some examples, the substrate comprises a plurality of layers of material selected from polymeric materials (e.g. polymeric materials selected from PE, LLDPE, MDPE, PP, BOPP, PET and OPA), metallic materials (e.g. metallic foils such as aluminium foil, or metallized films such as met-PET, met-BOPP or any other metalized substrate), paper and combinations thereof, in which a plastic film forms the surface onto which the electrostatic ink can be applied. In some examples, the substrate comprises a plurality of layers of film of a plastic material, such as a combination of films selected from PE, LLDPE, MDPE, PP, BOPP, PET and OPA, laminated together to form the pre-laminated substrate with a plastic film surface onto which electrostatic ink can be applied. In some examples, the pre-laminated substrate comprises a Paper/Alu/PE, PET/Al/PE, BOPP/met-BOPP or PET/PE laminate.

In some examples, the substrate comprises a thin film of material, wherein the film has a thickness of 600 μm or less, for example, 250 μm or less, for example, 200 μm or less, for example, 150 μm or less, for example, 100 μm or less, for example, 90 μm or less, for example, 80 μm or less, for example, 70 μm or less, for example, 60 μm or less, for example, 50 μm or less, for example, 40 μm or less, for example, 30 μm or less, for example, 20 μm or less, for example, 15 µm or less. In some examples, the film of material is about 12 µm in thickness.

In some examples, the substrate comprises a thin film of material, wherein the film has a thickness of 12 µm or more, for example, 15 µm or more, for example, 20 µm or more, for example, 30 µm or more, for example, 40 µm or more, for example, 50 µm or more, for example, 60 µm or more, for example, 70 µm or more, for example, 80 µm or more, for example, 90 µm or more. In some examples, the film has a thickness of about 100 µm or more, in some examples, about 100 µm or more.

In some examples, the substrate comprises a thin film of material, wherein the film is from 12 µm to 600 µm in thickness, in some examples, from 15 µm to 250 µm in thickness, in some examples, from 20 µm to 200 µm in thickness, in some examples, from 30 µm to 150 µm in thickness, in some examples, 40 µm to 100 µm in thickness, in some examples, 50 µm to 150 µm, in some examples, 60 µm to 100 µm in thickness, in some examples, 70 to 90 µm in thickness.

EXAMPLES

The following illustrates examples of the liquid electrostatic ink developer assembly, liquid electrostatic printing apparatus and method of liquid electrostatic printing, as well as related aspects described herein. Thus, these examples should not be considered to restrict the present disclosure, but are merely in place to teach how to carry out methods and use apparatus of the present disclosure.

Materials
Resins
AC-5120 (Honeywell): a copolymer of ethylene and acrylic acid, made with nominally 15 wt. % acrylic acid. Melt flow rate of ~1000 g/10 min.
Nucrel® 925 (DuPont): a copolymer of ethylene and methacrylic acid, made with nominally 15 wt. % methacrylic acid. Melt flow rate=25 g/10 min.
Elvax® 210W (DuPont): a copolymer of ethylene and vinyl acetate, made with 28 wt. % vinyl acetate, and contains a "W" amide additive. Melt flow rate=400 g/10 min.
Nucrel® 599 (DuPont): a copolymer of ethylene and methacrylic acid, made with nominally 10 wt. % methacrylic acid. Melt flow rate=450 g/10 min.
Nucrel® 699 (DuPont): a copolymer of ethylene and methacrylic acid, made with nominally 11 wt. % methacrylic acid. Melt flow rate=95 g/10 min.
Carrier Liquid
Isopar L (EXXON): an isoparaffinic oil.
Charge Adjuvant
VCA (Sigma-Aldrich): an aluminium stearate.
Charge Director
NCD a natural charge director having the components (i) natural soya lecithin, (ii) basic barium petronate, and (iii) dodecyl benzene sulfonic acid, amine salt, with the components (i), (ii) and (iii) being present in a weight ratio of 6.6%:9.8%:3.6%.
Pigment
A mixture of Monarch 800 (Cabot; a speciality carbon black pigment) and Print Alkali Blue D 6200 (Flint Group) in a ratio of 5:1 respectively.

Example 1

A transparent paste (40 wt. % solids) was formed by mixing the resins Nucrel® 925 (first resin) and AC-5120 (second resin) in a 50:50 (wt./wt.) ratio with Isopar L in a Ross reactor (Model DPM-2, obtained from Charles Ross & Son Company-Hauppauge N.Y.) at 130° C. and a mixing rate of 50 rpm for 1 h. The mixing rate was then increased to 70 rpm and mixing was continued at 130° C. for a further 1.5 h. The temperature was then gradually reduced to 25° C. over at least 2.5 h under continued mixing at 70 rpm to form the transparent paste.

The transparent paste was then ground with a black pigment (19 wt. % of solids) for 12 h in the presence of VCA (1.2 wt. % of solids) in an SS attritor at 58° C. and 250 rpm for 1 h, and then at 36° C. and 250 rpm for 10.5 h forming a liquid electrostatic ink composition. The ink was then diluted to 2 wt. % solids. A charge director (NCD, estimated 100 mg per 1 g ink) was added to the 2 wt. % ink composition on the printing press.

Example 2

A liquid electrostatic ink composition was formulated as described in Example 1 except that Nucrel® 925 (first resin), AC-5120 (second resin) and Elvax 210W (third resin) were used as the resin mixture in a 45:50:5 (wt./wt./wt.) ratio.

Example 3

A liquid electrostatic ink composition was formulated as described in Example 1 except that Nucrel® 599 (first resin) and AC-5120 (second resin) were used as the resin mixture in a 60:40 (wt./wt.) ratio.

Reference Example 1 (HP ElectroInk 4.5)

A liquid electrostatic ink composition was formulated as described in Example 1 except that Nucrel® 699 (first resin) and AC-5120 (second resin) were used as the resin in an 80:20 (wt./wt.) ratio.

Tests
Percentage Acid
The percentage of the total resin mixture comprising monomers containing acid side groups (methacrylic acid or acrylic acid monomers) was calculated (see Table 1 below) according to the following equation:

Total wt. % acid=(wt. % of resin $A$)×(wt. % acid monomers in resin $A$)+(wt. % of resin $B$)×(wt. % acid monomers in resin $B$)+(wt. % of resin $C$)×(wt. % of acid monomers in resin $C$)

Melt Flow Rate
The melt flow rate (MFR) of the total resin mixture was calculated (see Table 1 below) according to the following equation:

Total MFR=exp[(wt. % of resin $A$)×ln(MFR of resin $A$)+(wt. % of resin $B$)×ln(MFR of resin $B$)+(wt. % of resin $C$)×ln(MFR of resin $C$)]

Young's Modulus
The Young's modulus (see Table 1 below) for each transparent ink paste (at 40 wt. % solids) was measured using an INSTRON 3365 machine and following the procedure of ASTM D638.

Percentage Swelling
The swelling of the resins in Isopar L was determined by forming the transparent pastes as described above (see Table 1 below). The paste was then dried completely by heating at 65° C. for 5 days to form a dry disc of the paste. The dry disc was weighed. The dry disc was then placed in Isopar L for 5 days at 45° C. After the weight of the disc had stabilized, the disc was weighed again. The weight percentage swelling was calculated by determining the percentage change in weight.

Tensile Elongation

The tensile elongation (see Table 1 below) for each transparent ink paste was measured using an INSTRON 3365 machine and following a procedure based on ASTM D638.

TABLE 1

|  | MFR [g/10 min] | Percentage Acid [wt. %] | Young's Modulus [MPa] | Percentage Swelling [wt. %] | Tensile elongation [%] |
|---|---|---|---|---|---|
| Ref. Ex. 1 (EI 4.5) | 150 | 12 | 59.3 ± 4.8 | 25 | 160 ± 23 |
| Ex. 1 | 160 | 15 | 25 ± 0.3 | 29 | 230 ± 56 |
| Ex. 2 | 182 | 14 | 29.5 ± 5 | 43 | 260 ± 70 |
| Ex. 3 | 620 | 12 |  |  |  |

Printing Tests

Printed substrates were prepared by liquid electrostatically printing the liquid electrostatic ink compositions on plastic film substrates and paper substrates using an HP Indigo 7600 printing press in 4 shot mode.

Transferability Tests

The ability of the electrostatic ink composition to transfer from the intermediate transfer member (blanket) to the substrate was tested by comparing the performance of the new ink compositions with that of Reference Example 1 (HP ElectroInk 4.5). All ink compositions were printed at 30% gray.

Figure 1B:
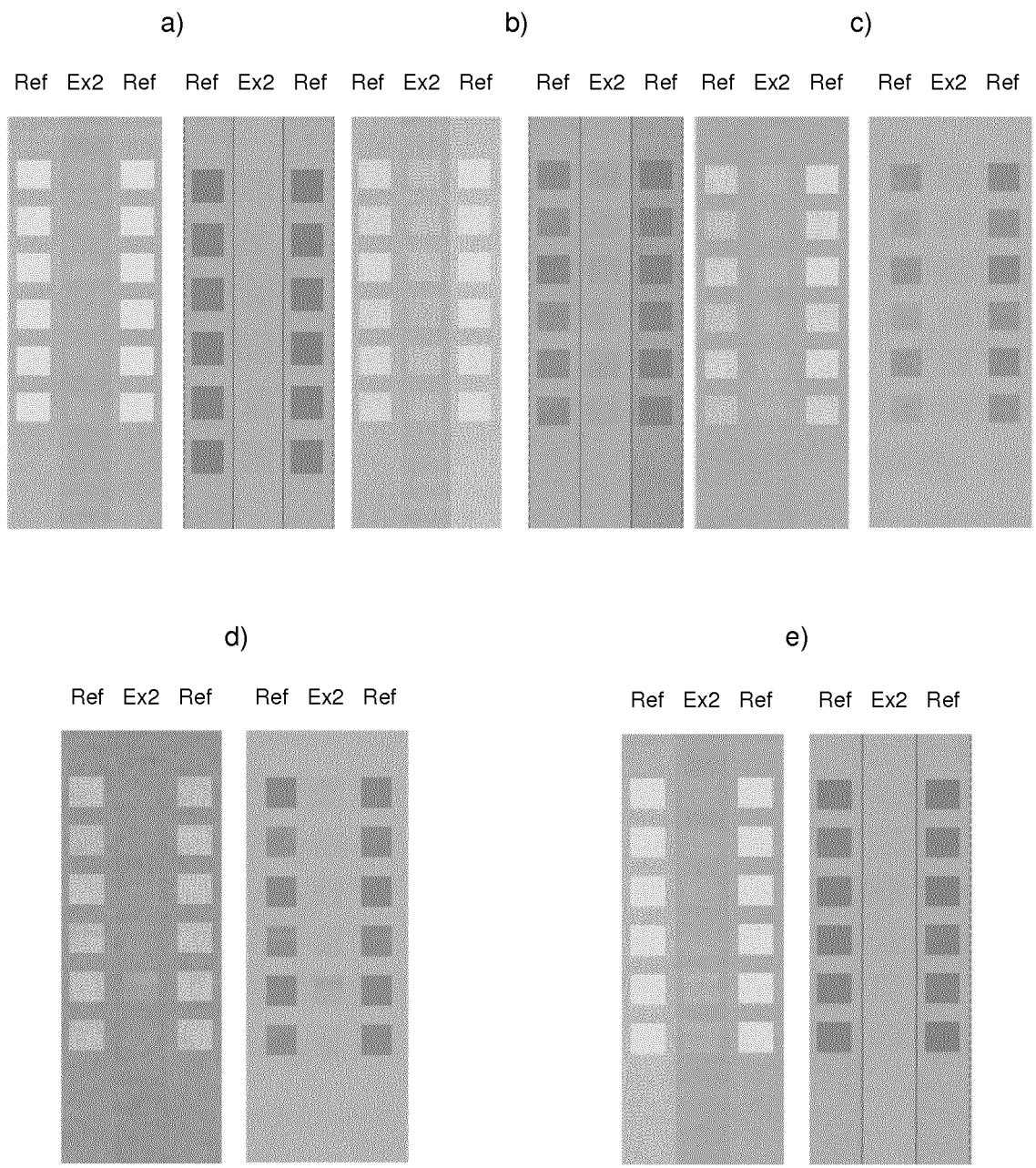
Figure 1C:
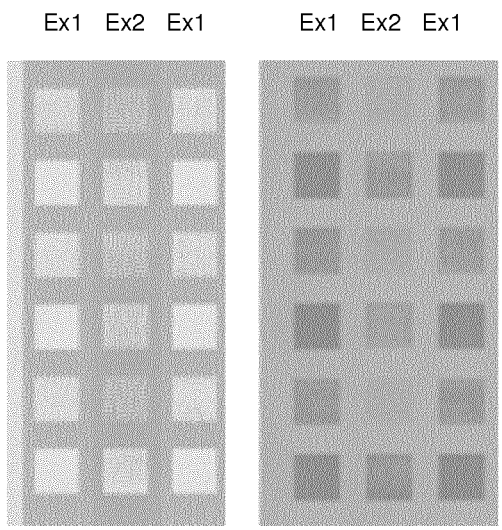

A new blanket was installed in the printing press (HP Indigo 7600 series LEP printing press) and the blanket's ability to release ink was uniformly deteriorated by printing 2000-4000 impressions of a job in which the 1$^{st}$ 3 separations run without fluids (BID bypassed) and the following 2 print a non-test ink (regular squares of ink in a grid pattern, Reference Example 1). The blanket is then cleaned, and the transfer assessment test begins: vertical bars of both test and reference inks printed on a substrate with relatively low affinity to ElectroInk 4.5 ("bad" substrate) in sub-optimal conditions, followed by a cleaner page. The level of the signal can be fine-tuned by changing the size of the nip between the intermediate transfer roller and the impression cylinder (also called the T2 gap), this job is immediately followed by a solid yellow page (yellow ElectroInk 4.5) printed on a good substrate at optimal conditions, that completely cleans all ink remnants from the blanket. Any black ink that was not transferred onto the "bad" substrate (Reference Example 1) or test ink is visible as a contamination (darker portions) of the yellow printed pages. These pages are shown in FIG. 1 (right hand images for each substrate)..

A variety of substrates were used as the print substrates in these tests: FIG. 1A shows a comparison of Reference Example 1 and Example 1 ink compositions printed on a) UPM Fine (coated paper); b) UPM Finesse (uncoated paper); c) PET (Polyester, transparent plastic with a white paper backing layer); d) PP (polypropylene: white plastic without paper backing layer). FIG. 1B shows a comparison of Reference Example 1 and Example 2 ink compositions printed on a) UPM Finesse; b) UPM Fine; c) Soproset (uncoated paper); d) PET; e) PP. FIG. 10 shows a comparison of Example 1 and Example 2 ink compositions printed on UPM Finesse.

The Figures show the results of printing the gray images (left hand image) for the Reference Example and Example 1 and Example 2 ink compositions next to the pages of printed with the yellow "cleaner" ink composition (right hand image) showing the residual gray ink remaining on the blanket.

Peeling Tests

Peeling tests were performed on several substrates at different coverages (100%, 200%, 300% and 400%) of liquid electrostatic ink.

Six horizontal strips of black reference ink (Reference Example 1) were printed at variable coverages (3 strips at 100% and one strip at each of 200%, 300% and 400%) by using an HP Indigo 7600 series LEP printing press.

A vertical strip of the liquid electrostatic ink produced in Example 1 or 2 was printed using an HP Indigo 7600 series LEP printing press at variable coverage such that each of the six horizontal strips of black reference ink is overprinted with liquid electrostatic ink at a coverage corresponding to that of the horizontal strip (3 strips were overprinted at 100% coverage and one strip at each of 200%, 300% and 400%).

Ten minutes after completing the printing, adhesive tape (scotch tape number 234; available from 3M company) was applied to the vertical strip of liquid electrostatic ink. A heavy roller (1.2 kg) was rolled over the adhesive tape 10 times. The adhesive tape was then removed rapidly at 180° over 2 seconds.

Figure 2:
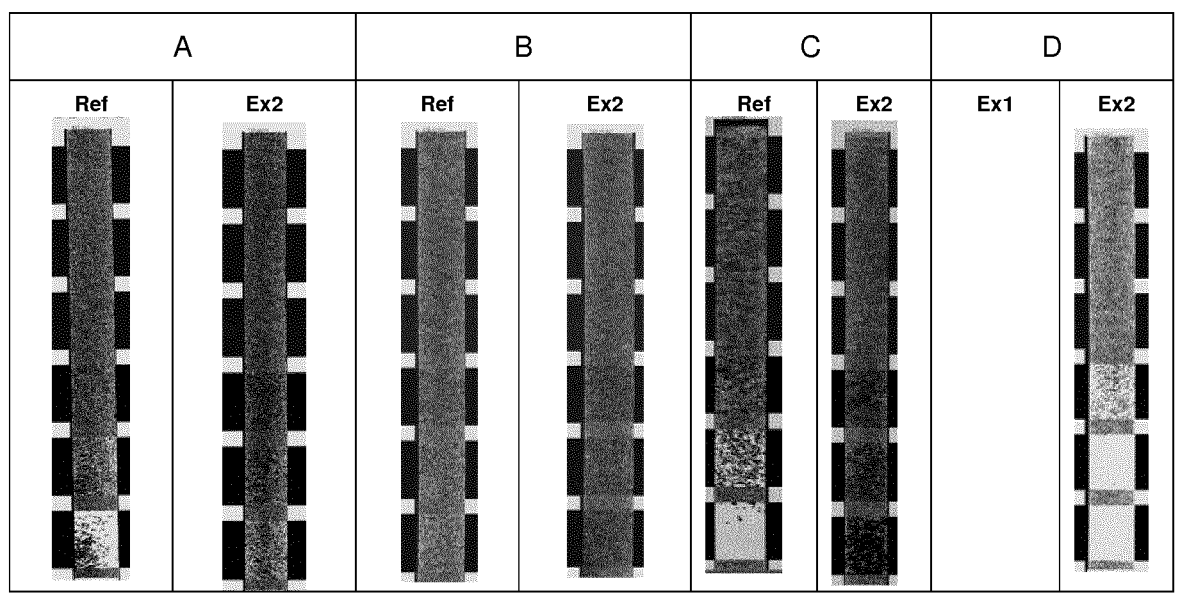
FIG. 2 shows the results of the peeling tests on images printed with ink produced according to Example 2.

The peeling resistance of printed inks produced according to Reference Example 1 and Example 2 was compared on four different substrates: UPM Finesse (coated paper: FIG. 2A), Soproset (uncoated paper; FIG. 2B), PET film (FIG. 2C) and PP film (FIG. 2D). It is notable that the ink produced according to Example 1 failed to transfer to polypropylene film during printing and therefore could not be tested for peel resistance.

The peeling resistance of printed inks produced according to Examples 1 and 3 was also tested on a variety of paper (coated and uncoated) and plastic substrates. Both ink compositions show improved peeling resistance, in particular when printed on plastic films, when compared to the peeling resistance shown by inks produced according to Reference Example 1.

The invention claimed is:

1. An electrostatic ink composition comprising:
   a carrier liquid;
   a first resin comprising a copolymer of an alkylene monomer and a methacrylic acid monomer, wherein the first resin constitutes from 40 wt. % to 65 wt. % of a total amount of resin;
   a second resin comprising a copolymer of an alkylene monomer and an acrylic acid monomer, wherein the second resin constitutes from at least 35 wt. % to 60 wt. % of the total amount of resin; and
   a third resin comprising a copolymer of an alkylene monomer and a vinyl ester monomer, wherein the third resin constitutes from 0.5 wt. % to 9.5 wt. % of the total amount of resin;
   wherein the first resin and the second resin and the third resin are present in a ratio (wt./wt./wt.) of 45:50:5.

2. The electrostatic ink composition according to claim 1, wherein the vinyl ester monomer is vinyl acetate.

3. The electrostatic ink composition according to claim 1, wherein the second resin constitutes at least 40 wt. % to 60 wt. % of the total amount of resin.

4. The electrostatic ink composition according to claim 1, wherein the methacrylic acid monomer constitutes 10 wt. % or more of the monomers of the first resin.

5. The electrostatic ink composition according to claim 1, wherein the methacrylic acid monomer constitutes 14 wt. % or more of the monomers of the first resin.

6. The electrostatic ink composition according to claim 1, wherein the alkylene monomer of the first resin is selected from ethylene or propylene.

7. The electrostatic ink composition according to claim 1, wherein the alkylene monomer of the second resin is selected from ethylene or propylene.

8. The electrostatic ink composition according to claim 1, wherein the acrylic acid monomer constitutes 13 wt. % or more of the second resin.

9. The electrostatic ink composition according to claim 1, wherein the first resin has a melt flow rate (190° C/2.16 kg) of 50 g/10 min or less determined by using ASTM D1238 or ISO 1133.

10. The electrostatic ink composition according to claim 1, wherein the alkylene monomer of the third resin is selected from ethylene or propylene.

11. The electrostatic ink composition according to claim 1, wherein the second resin has a melt viscosity of 15000 poise or less.

12. A method of producing an electrostatic ink composition, the method comprising combining:
a carrier liquid;
a first resin comprising a copolymer of an alkylene monomer and a methacrylic acid monomer, wherein the first resin constitutes from 40 wt. % to 65 wt. % of a total amount of resin;
a second resin comprising a copolymer of an alkylene monomer and an acrylic acid monomer, wherein the second resin constitutes from at least 35 wt. % to 60 wt. % of the total amount of resin; and
a third resin comprising a copolymer of an alkylene monomer and a vinyl ester monomer, wherein the third resin constitutes from 0.5 wt. % to 9.5 wt. % of the total amount of resin;
wherein the first resin and the second resin and the third resin are present in a ratio (wt./wt./wt.) of 45:50:5.

13. A printed substrate, the printed substrate comprising:
a plastic film; and
an electrostatically printed ink disposed on the plastic film;
wherein the electrostatically printed ink composition comprises:
a first resin comprising a copolymer of an alkylene monomer and a methacrylic acid monomer, wherein the first resin constitutes from 40 wt. % to 65 wt. % of a total amount of resin;
a second resin comprising a copolymer of an alkylene monomer and an acrylic acid monomer, wherein the second resin constitutes from at least 35 wt. % to 60 wt. % of the total amount of resin: and
a third resin comprising a copolymer of an alkylene monomer and a vinyl ester monomer, wherein the third resin constitutes from 0.5 wt. % to 9.5 wt. % of the total amount of resin;
wherein the first resin and the second resin and the third resin are present in a ratio (wt./wt./wt.) of 45:50:5.

* * * * *